United States Patent [19]

Allen et al.

[11] 4,218,933
[45] Aug. 26, 1980

[54] RACK AND PINION GEAR ASSEMBLY

[75] Inventors: David H. Allen, Avon, England; Peter R. Rogers, West Glamorgan; John Whitney, Mid Glamorgan, both of Wales

[73] Assignee: Cam Gears Limited, Hertfordshire, England

[21] Appl. No.: 949,814

[22] Filed: Oct. 10, 1978

[51] Int. Cl.² .......................... F16H 1/04; B62D 1/20
[52] U.S. Cl. ........................................ 74/422; 74/498; 308/3 R; 308/238
[58] Field of Search ...................... 74/89.17, 409, 422, 74/424.6, 498; 308/3 R, 238

[56] References Cited

U.S. PATENT DOCUMENTS

| 719,562 | 2/1903 | Brush | 74/422 |
|---|---|---|---|
| 1,288,355 | 12/1918 | Woodard | 308/3 R |
| 3,623,379 | 11/1971 | Bradshaw et al. | 74/498 |
| 3,820,415 | 6/1974 | Cass | 74/409 X |
| 4,016,774 | 4/1977 | Baker et al. | 74/498 X |

Primary Examiner—Lawrence J. Staab

[57] ABSTRACT

A rack and pinion gear assembly 10 (FIG. 1) includes a resilient bushing which urges the rack into meshing engagement with the pinion. An arcuate inside bearing surface 54 (FIG. 4) of the bushing 18 has a larger radius of curvature than the curved outside surface 52 of the rack 12 against which it bears. The rack thus makes tangent contact with the bushing 18. When one portion of the bushing 18 is worn and therefore excessive play appears in the steering gear assembly 10, the bushing may be removed from the housing 16 of the assembly and rotated 180° and then reinserted into the housing to thereby provide an unworn bearing surface which slidably engages the rack 12. The bushing 18 includes a plurality of axially extending grooves 70, 72, 74, and 76 through which lubricant is supplied to the bearing surfaces 52 and 54. In a second embodiment (FIG. 5) the aperture 50b in the bushing 18b through which the rack 12b extends has a square cross section and is in tangent contact with the rack at two locations 84 and 86. In a third embodiment (FIG. 3) the aperture 50c in the bushing through which the rack 12c extends is composed of four arcuate segments 100, 102, 104, and 106 each having the same radius of curvature, and each having a different center of curvature 110, 112, 114, and 116, respectively. This provides tangent contact between the rack 12c and the bushing 18c at two axially extending areas 120 and 122.

19 Claims, 6 Drawing Figures

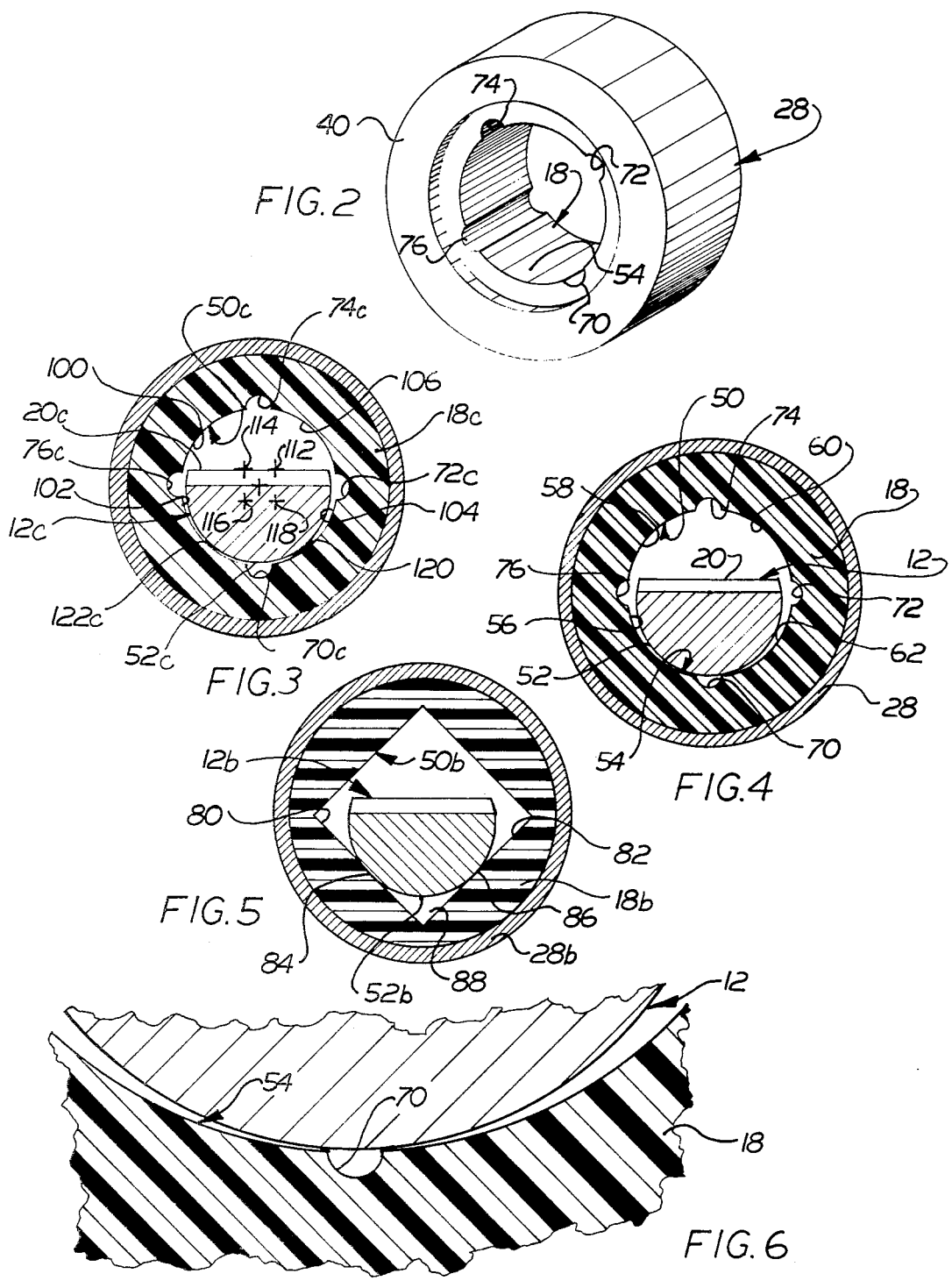

RACK AND PINION GEAR ASSEMBLY

BACKGROUND OF THE INVENTION

The present invention relates to a rack and pinion gear assembly, and more particularly to an improved bushing for urging the rack into engagement with the pinion gear.

The rack and pinion gear assembly may be used in an automobile in its steering system. When so used, the gear assembly is subjected to numerous shocks and vibrations as part of normal wear. After an extended period of use, backlash or play may develop between the rack and the pinion gear. This play is undesirable because it decreases the responsiveness of the steering system and results in excessive "play" being felt at the steering wheel.

Numerous solutions have been devised to eliminate play between a rack and a pinion gear. In one solution a U-shaped plastic bushing or yoke is disposed in sliding contact with the side of the rack opposite the rack teeth. A spring acting between the housing of the gear assembly and the yoke urges the rack teeth into engagement with the pinion gear. In another solution, the rack is supported in an annular bushing fabricated from a resilient plastic material. The resilience of the bushing serves to urge the rack teeth into engagement with the pinion gear.

With either of these solutions, a portion of the bushing which bears against the rack will become worn. When this occurs, undesirable play develops between the rack and pinion gear. To restore the gear assembly to its original condition, the entire bushing must be replaced even though only a portion of it is worn.

SUMMARY OF THE INVENTION

The present invention provides a new and improved rack and pinion steering gear assembly which eliminates the necessity of replacing a bushing in order to eliminate play between a rack and pinion gear. A rack extends through an aperture in an annular bushing made of a resilient plastic material. The bushing presses against a curved side of the rack and urges the teeth on the opposite side of the rack into engagement with the pinion gear. When the portion of the bushing which bears against the rack becomes worn and play develops in the steering gear, the bushing may be rotated so that an unworn portion of its bearing surface engages the rack.

In one specific preferred embodiment the bushing has a cylindrical inside bearing surface with a radius of curvature which is larger than the radius of curvature of the curved side of the rack. The curved outside surface of the rack makes linear or tangent contact with the inside bearing surface of the bushing. Deformation of the resilient bushing causes contact between the bushing and the rack to be spread over an area which extends parallel to the axis of the rack and the bushing.

Lubrication for the bushing is provided through an axially extending groove in the bearing surface of the bushing. The groove bisects the area of contact between the bushing and the rack. There are four lubrication grooves evenly spaced about the inside circumference of the bushing. As wear occurs, the bushing may be rotated to present unworn portions of the bearing surface to the rack. In each position a groove bisects the area of contact to supply lubricant to the rack and bushing.

A second embodiment is generally similar to the first embodiment except for the contour of the bearing surface of the bushing. In this embodiment, the aperture in the bushing through which the rack extends has a square cross section. The bushing is oriented in the housing of the gear assembly so that the rack makes tangent contact with it along two spaced apart, axially extending areas.

A third embodiment is generally similar to the first embodiment except for the contour of the bearing surface of the bushing. In this third embodiment the bearing surface is composed of four peripherially disposed arcuate segments. The radius of curvature of each segment is the same and is larger than the radius of curvature of the rack. However, the center of curvature for each segment is different. Lubrication grooves are provided between each of the segments.

The operation of the third embodiment is the same as the first embodiment. In each position of the bushing, the rack contacts the bushing on a pair of axially extending areas separated by a lubrication groove. The bushing may be rotated to provide an unworn pair of surfaces against which the rack may slide.

Accordingly, it is an object of the present invention to provide a new and improved rack and pinion steering gear assembly having a resilient bushing, a first portion of which engages the rack for urging the rack into engagement with a pinion gear, and in which the bushing is rotatable with respect to a housing to place a second portion of the bearing surface in engagement with the rack to thereby compensate for the wear of the first portion of the bushing.

It is a further object of the present invention to provide a new and improved rack and pinion steering gear assembly as set forth in the preceding object in which the bushing includes an arcuate inside bearing surface with a first radius of curvature which is larger than the radius of curvature of the rack to thereby provide a longitudinally extending area of contact between the bushing and the rack.

It is a further object of the present invention to provide a new and improved rack and pinion steering gear assembly as set forth in any of the preceding objects wherein the inside bearing surface of the bushing includes a plurality of arcuate bearing sections each of which has the same center of curvature.

It is a further object of the present invention to provide a new and improved rack and pinion steering gear assembly as set forth in the first object in which the bushing includes a plurality of arcuate bearing sections each of which has a different center of curvature.

It is a further object of the present invention to provide a new and improved rack and pinion steering gear assembly as set forth in the first object in which the inside bearing surface of the bushing defines an aperture having a square cross section.

It is a further object of the present invention to provide a new and improved rack and pinion steering gear assembly as set forth in any of the above objects in which the bushing is provided with at least one axially extending recess for receiving lubricant and which bisects the area of contact between the rack and the bushing.

BRIEF DESCRIPTION OF THE DRAWINGS

These and other objects and features of the present invention will become more apparent upon a reading of the following description taken together with the accompanying drawings in which:

FIG. 2 is a perspective illustration of the embodiment of the present invention shown in FIG. 1 and illustrating grooves through which lubricant is supplied to the contact surfaces;

FIG. 3 is a sectional view taken along line 3—3 of FIG. 1 showing tangent contact at two places between a rack and a resilient bushing having four arcuate bearing surfaces each having the same radius of curvature, but each having a different center of curvature;

FIG. 4 is a sectional view generally similar to FIG. 3 illustrating another embodiment of the invention in which a resilient bushing has four arcuate bearing sections each having the same radius of curvature and each having the same center of curvature;

FIG. 5 is a sectional view generally similar to FIG. 3 illustrating another embodiment of the present invention and showing tangent contact at two places between a rack and a resilient bushing having an aperture with a square cross section; and FIG. 6 is an enlarged view of a portion of FIG. 4 illustrating the contact between a rack and a resilient bushing having a larger radius of curvature than the rack.

DESCRIPTION OF SPECIFIC PREFERRED EMBODIMENTS

Figure 1:
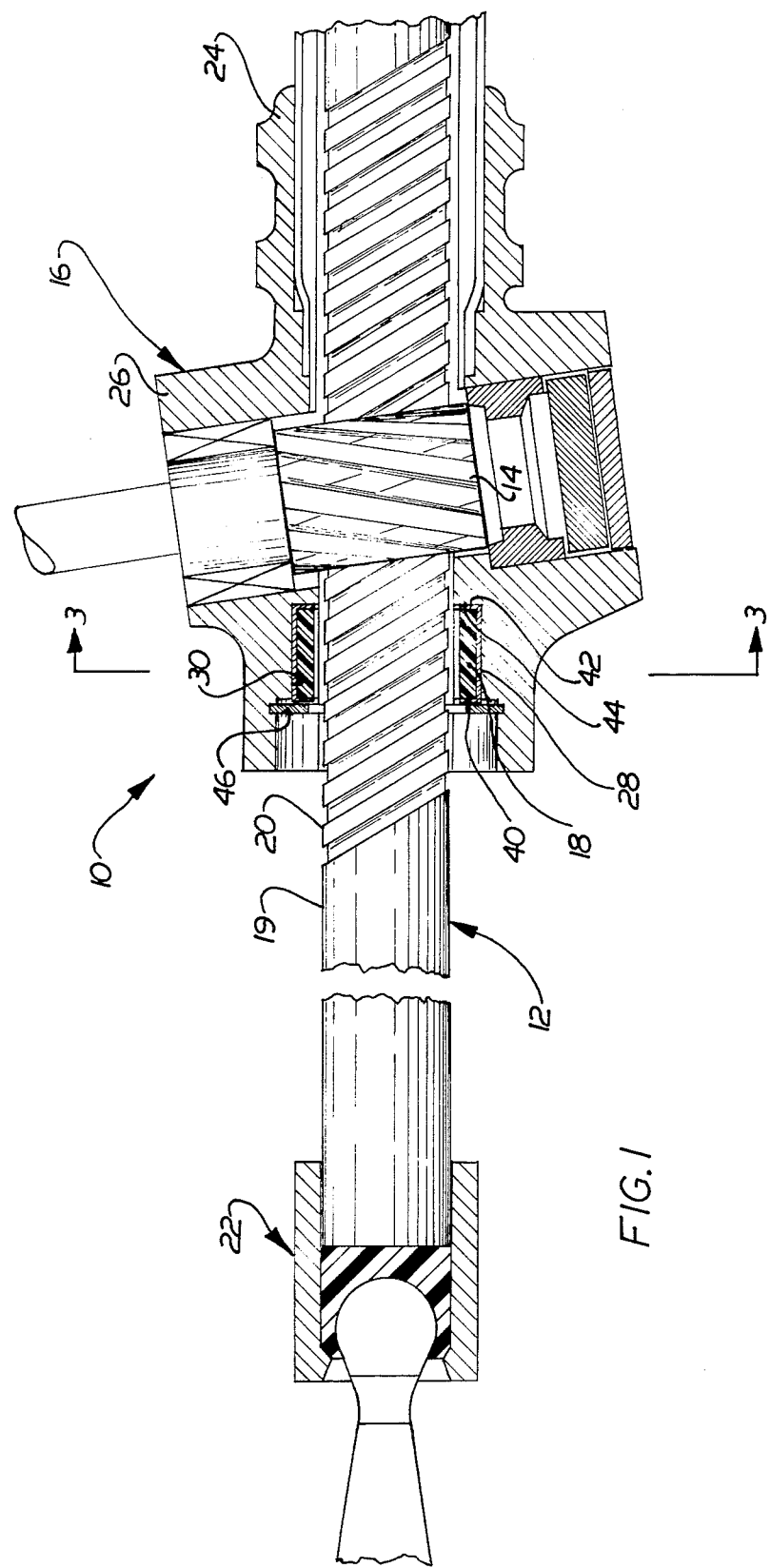
FIG. 1 is a partially broken away sectional view through a rack and pinion steering gear assembly constructed in accordance with the present invention.

A rack and pinion gear assembly 10 (FIG. 1) constructed in accordance with the present invention includes a rack 12, a pinion gear 14, a housing 16, and a bushing 18. The rack 12 has a generally cylindrical main body 19 and an axially extending array of teeth 20. The pinion gear 14 has teeth which engage the teeth 20 on the rack 12. Rotation of the pinion 14 causes axial movement of the longitudinally extending rack 12 relative to the housing 16. When used in an automobile in connection with a steering linkage, the pinion gear 14 is connected with the steering wheel, and the rack 12 is connected through one or more ball joints 22 (only one shown) with steerable vehicle wheels in a well known manner.

The housing 16 includes a first tubular portion 24 through which the rack extends. Extending transverse to the first tubular portion 24 is a second tubular portion 26 in which the pinion gear is rotatably mounted. The resilient plastic bushing 18 is mounted in a sleeve 28 which in turn is received in a cylindrical passage 30 through the housing 16. The rack 12 extends through an aperture in the bushing 18 and is engaged by the bushing to hold it in engagement with the pinion gear 14.

Because the bushing 18 holds the rack 12 in engagement with the pinion gear 14, the bushing should be located in the housing 16 near the pinion gear. While only one bushing 18 is shown, it is contemplated that another bushing similar to bushing 18 could be utilized on the opposite side of the pinion gear 14.

The bushing 18 is most advantageously formed from the resilient material such as polypropylene or neoprene. Using a bushing 18 formed from such a resilient material eliminates the need for a resiliently loaded saddle or yoke common in the prior art. Further, the use of a resilient bushing reduces the production costs of gear assemblies by increasing the allowable manufacturing tolerances and reducing the size of the housing. In addition, the resilient bushing 18 improves lubrication of the steering gear assembly 10 and obsorbs shock loads which may be applied to the rack 12, especially in steering gear applications.

The bushing 18 is mounted within a metal sleeve 28 (FIGS. 1 and 2). The outside surface of the bushing 18 is in tight abutting engagement with the inside surface of the sleeve 28 to thereby prevent relative rotation between the bushing and the sleeve. This sleeve is provided with a pair of radially inwardly extending flanges 40 and 42 which prevent axial motion of the bushing 18 with respect to the sleeve 28.

The cylindrical outside surface of sleeve 28 is disposed in a cylindrical passage 30 in the housing 16. The axis of the passage 30 is parallel to the axis of the rack 12. Tight engagement between the sleeve 28 and the passage 30 prevents relative rotation of the sleeve 28 with respect to the housing 16. Axial motion of the sleeve 28 in one direction is prevented by abutting engagement of flange 42 against an annular shoulder 44 in the housing 16. Axial motion of the sleeve 28 in the opposite direction is prevented by abutting engagement of flange 40 with removable spring clip 46.

As will be discussed more fully below and as can be seen more clearly in FIGS. 3, 4, 5, and 6, only a portion of the bushing 18 is actually in contact with the rack 12. After a period of use the portion of the bushing 18 which is in contact with the rack 12 may become worn so that excessive play may develop in the steering gear assembly. To compensate for wear of the bushing 18, it is only necessary to rotate the sleeve 28 and the bushing 18 until an unused portion of the bushing 18 is in contact with the rack 12.

To rotate the bushing 18, the spring clip 46 is removed. The sleeve 28 and bushing 18 are pressed out of the cylindrical passage 30 in the housing 16. The sleeve 28 and bushing 18 then are rotated 180° and reinserted in housing 16. The ability to rotate the bushing 18 greatly extends the useful life of the bushing 18, especially compared to prior art devices in which the bushing, when once worn, must be discarded in its entirety. As noted above the sleeve 28 may be a tight fit in the cylindrical passage 30 in the housing 16. This tight fit may be sufficient to hold the sleeve 28 against rotation relative to the housing 16. However, in some circumstances it may be preferable to provide a set screw (not shown) to secure the bushing 18 and the sleeve 28 against rotation relative to the housing 16.

A bushing 18 (FIG. 4) suitable for use in the present invention is provided with an axially extending aperture 50 through which the rack 12 extends. A curved bottom side surface 52 of the rack 12 opposite from the teeth 20 is disposed in sliding abutting engagement with the bearing surface 54 of the bushing 18 at a location adjacent to the pinion gear 14. In a first embodiment illustrated in FIG. 4 the bearing surface 54 is composed of four arcuate segments 56, 58, 60, and 62 of equal length. The radius of curvature and center of curvature of each segment 56, 58, 60, and 62 are the same. Further the radius of curvature of the segments is larger than the radius of the curved circular surface 52 of the rack 12.

If the bushing 18 were made of an absolutely incompressible material, the contact between the bushing and the rack 12 would be tangent contact along axially extending lines on opposite sides of a lubricant groove 70. However, because of the resilient nature of the bushing 18 and because of normal wear of the bushing, the contact between the rack 12 and the bearing surface 54 of the bushing 18 is along two axially extending areas (see FIG. 5) on either side of a groove 70.

The bearing surface 54 (FIG. 4) of the bushing 18 is provided with four axially extending grooves 70, 72, 74, and 76. The axially extending grooves 70—76 separate the segments 56, 58, 60, and 62 from each other and enable lubricant to move axially along the bushing 18. The bushing 18 is oriented in the housing 16 so that one of the grooves 70, 72, 74, or 76 bisects the areas of contact between the bushing 18 and the rack 12 to thereby enable lubricant to be supplied to each of the areas of contact throughout its axial extent.

Another embodiment of a bushing suitable for use in the present invention is illustrated in FIG. 5 in which similar numerals have been used to indicate similar parts. The bushing 18b cooperates with the sleeve 28b in the same manner as in the first embodiment. The difference between the first embodiment and the second embodiment resides in the shape of the aperture 50b through which the rack 12b extends. The aperture 50 of FIG. 4 has a generally circular cross sectional configuration. As illustrated in FIG. 5 the aperture 50b has a square cross sectional configuration. Thus the curved main body portion 52b of the rack 12b is in contact with two flat sides 80 and 82 of the aperture 50b along two axially extending areas 84 and 86. Lubricant from a triangular area 88 is supplied to the contact areas 84 and 86.

Although the aperture 50b is shown as having a square cross section, this is by way of example only. It will be appreciated by those skilled in the art that other polygonal shapes will function equally as well.

Further, it will be appreciated that the bushing 18b illustrated in FIG. 5 is rotatable in the same manner as the bushing 18 illustrated in FIG. 4. The resilient bushing 18b (FIG. 5) makes contact with the rack 12b along two areas 84 and 86. When these areas become worn, the bushing 18b may be rotated 180° about its central axis to face unworn contact areas toward the curved bottom side surface 52b of the rack 12b.

Another embodiment of a bushing suitable for use in the present invention is illustrated in FIG. 3 in which similar numerals have been used to indicate similar parts. The bushing illustrated in FIG. 3 is in some respects similar to the bushing disclosed in U.S. Pat. No. 3,673,379 assigned to the assignee of the present invention and which is incorporated herein by reference.

The bushing 18c is generally similar to the first and second embodiments of the present invention except that the shape of the aperture 50c differs from apertures 50 (FIG. 4) and 50b (FIG. 5). The aperture 50c (FIG. 3) is composed of four arcuate segments 100, 102, 104, and 106. The segments are equal in length and have the same radius of curvature which is larger than the radius of curvature of the curved main body portion 52c of the rack 12c.

The difference between the embodiment illustrated in FIG. 4 and the embodiment illustrated in FIG. 3 lies in the location and center of curvature of each of the segments 100, 102, 104, and 106 which form the aperture 50c. In the embodiment illustrated in FIG. 4 the center of curvature of each of the segments was identical and located along the central axis of the bushing 18. In the embodiment illustrated in FIG. 3, each segment 100, 102, 104, and 106, has a different center of curvature. Thus, the center of curvature of segment 100 is located at the point indicated by the numeral 110. Likewise the center of curvature of segment 102 is indicated by the numeral 112; the center of curvature of segment 104 is indicated by the numeral 114, and the center of curvature of segment 106 is indicated by the numeral 116.

When the rack 12c is installed in the bushing 18c as illustrated in FIG. 3, the curved portion 52c of the rack makes contact with a longitudinally extending area on each of two adjacent segments 102 and 104. Were the bushing 18c made of an incompressible material, tangent contact between the curved main body portion 52c of the rack 12c and the bushing 18c would occur along two axially extending lines indicated by the numerals 120 and 122. However, deformation of the resilient material which forms the bushing 18c causes the contact between the rack 12c and the bushing 18c to spread circumferentially a short distance to both sides of lines 120 and 122. Contact between the rack 12c and the bushing 18c is thus along two axially extending areas centered about the lines of contact 120 and 122.

As in the first embodiment illustrated in FIG. 4, the embodiment illustrated in FIG. 3 is provided with four lubrication grooves 70c, 72c, 74c, and 76c. Although the lines of tangent contact 120 and 122 are shown as being symmetrically disposed with respect to lubricant groove 70c and 90° apart from each other on the curved surface 52c of the rack 12c, the lines of tangent contact could be moved without departing from the scope of the present invention. It is obvious that this could be accomplished by changing the location of the centers of the curvature 110, 112, 114, and 116, or by changing the radius of curvature of the arcuate segments 100, 102, 104, and 106.

Further, it will be appreciated that the bushing 18c illustrated in FIG. 3 is rotatable in the same manner and in the same circumstances as the bushings 18b (FIG. 5) and 18 (FIG. 4). The resilient bushing 18c (FIG. 3) may become worn along the areas of contact 120 and 122 between the rack 12c and the bushing causing excessive play between the rack 12c and pinion gear 14 (FIG. 1). To eliminate the play the bushing 18c (FIG. 3) may be rotated 180° about its longitudinal central axis to bring unworn contact areas 100 and 106 into engagement with the curved bottomside surface 52c of the rack 12c.

In addition to the advantages recited above which stem from the ability to rotate the bushing 18 (or 18b or 18c) (FIG. 1) in the housing 16, the symmetry of the bushing 18 (or 18b or 18c) enable more rapid assembly of the gear assembly 10. During installation of the bushing 18 in the housing 16, in order to achieve proper orientation of the bushing, it is never necessary to rotate the bushing more than 45°.

Thus it is clear that the present invention provides a new and improved rack and pinion steering gear assembly 10 (FIG. 1) which eliminates the necessity of replacing a plastic bushing in order to eliminate play between a rack 12 and pinion gear 14. The rack 12 extends through an aperture in an annular bushing made of a resilient plastic material. The bushing 18 presses against a curved side 52 (FIG. 4) of the rack 12 and urges the teeth 20 on the opposite side of the rack into engagement with the pinion opposite side of the rack into engagement with the pinion gear 14 (FIG. 1). When the portion of the bushing 18 which bears against the rack 12 becomes worn and play develops in the assembly 10, the bushing 18 may be rotated so that an unworn portion of its bearing surface engages the rack.

In one preferred embodiment (FIG. 4) the bushing 18 has a cylindrical inside bearing surface 54 with a radius of curvature which is larger than the radius of curvature of the curved surface 52 of the rack 12. The curved outside surface 52 of the rack 12 makes tangent contact with the inside bearing surface 54. Deformation of the resilient material from which the bushing 18 is formed causes contact between the bushing and the rack to be spread over areas which extend parallel to the axis of the rack and the bushing.

Lubrication for the bushing 18 is provided through an axially extending groove 70 in the bearing surface of the bushing. The groove 70 bisects the area of contact between the bushing 18 and the rack 12. These are four lubrication grooves 70, 72, 74, and 76 evenly spaced about the inside circumference of the bushing 18. As wear occurs, the bushing 18 may be rotated to present unworn portions of the bearing surface 54 to the rack. In each position a lubrication groove bisects the area of contact to supply lubricant to the rack 12 and bushing 18.

Another embodiment (FIG. 5) is generally similar to the first embodiment except for the contour of the bearing surface of the bushing. In this embodiment, the aperture 50b in the bushing 18b through which the rack 12b extends has a polygonal cross section and which is illustrated as having a square shape. The bushing 18b is oriented in the housing of the gear assembly so that it makes tangent contact with the rack along two spaced apart, axially extending areas 84 and 86.

Another embodiment (FIG. 3) is generally similar to the first embodiment except for the contour of the bearing surface of the bushing 18c. In this third embodiment the bearing surface is composed of four periferially disposed arcuate segments 100, 102, 104, and 106. The radius of curvature of each segment is the same and is longer than the radius of curvature of the curved surface 52c of the rack 12c. However, the center of curvature for each segment is different. Lubrication grooves 70c, 72c, 74c, and 76c are provided at the connection of each segment 100, 102, 104, and 106 with the next.

The operation of the embodiment illustrated in FIG. 3 is the same as the first embodiment. In each position of the bushing 18c, the rack 12c contacts the bushing on pair of axially extending areas separated by a lubrication groove 70c. When segments 102 and 104 have become worn and play in the assembly 10 is therefore excessive, the bushing 18c may be rotated about its central axis to provide an unworn pair of segments i.e., 100 and 106, against which the rack 12c may slide.

Having described specific preferred embodiments, the following is claimed:

1. A rack and pinion steering gear assembly comprising a housing, a pinion gear rotatably mounted in said housing, a rack at least partially disposed in said housing in meshing engagement with said pinion gear, said rack having a longitudinally extending array of teeth and a longitudinally extending main body portion having a cross section which is at least partially defined by a circle, bushing means for urging the teeth on said rack into meshing engagement with said pinion, said bushing means including arcuate bearing surface means which at least partially defines a passage through said bushing means, and means releasably holding said bushing means in said housing for enabling said bushing means to be selectively moved relative to said housing from a first position in which said main body portion of said rack engages a first portion of said bearing surface means to a second position in which said main body portion of said rack engages a second portion of said bearing surface means to thereby compensate for wear of said first portion of said bearing surface means, said bearing surface means being at least partially defined by a plurality of arcuate bearing sections, each of said sections having the same radius of curvature and the same center of curvature, said radius of curvature being larger than the radius of curvature of said main body portion of said rack.

2. An assembly as set forth in claim 1 wherein said main body portion of said rack is disposed in sliding abutting engagement with two spaced apart, axially extending areas of said bearing surface means of said bushing means.

3. An assembly as set forth in claim 2 wherein said two spaced apart areas of said bearing surface means are separated by surface means defining an axially extending recess for receiving lubricant.

4. A rack and pinion steering gear assembly comprising a housing, a pinion gear rotatably mounted in said housing, a rack at least partially disposed in said housing in meshing engagement with said pinion gear, said rack having a longitudinally extending array of teeth and a longitudinally extending main body portion having a cross section which is at least partially defined by a circle, bushing means for urging the teeth on said rack into meshing engagement with said pinion, said bushing means including arcuate bearing surface means which at least partially defines a passage through said bushing means, and means releasably holding said bushing means in said housing for enabling said bushing means to be selectively moved relative to said housing from a first position in which said main body portion of said rack engages a first portion of said bearing surface means to a second position in which said main body portion of said rack engages a second portion of said bearing surface means to thereby compensate for wear of said first portion of said bearing surface means, said bearing surface means including a plurality of arcuate bearing sections, each of said sections having the same radius of curvature and a different center of curvature, said housing includes surface means defining a passage surrounding said rack and adapted to receive said bushing means, said bushing means further including an annular metal sleeve having an outside surface disposed in abutting engagement with said passage in said housing.

5. An assembly as set forth in claim 4 wherein the radius of curvature of said arcuate bearing sections is larger than the radius of curvature of said main body portion of said rack.

6. An assembly as set forth in claim 4 wherein said bushing means further includes surface means defining a plurality of grooves for receiving lubricant, each of said grooves being disposed between two of said arcuate bearing sections.

7. An assembly as set forth in claim 6 wherein said main body portion of said rack is disposed in sliding abutting engagement with first and second spaced apart axially extending areas of said inside bearing surface means, said first area including at least a portion of a first one of said arcuate bearing sections and said second area including at least a portion of a second one of said arcuate bearing sections, said second arcuate section being adjacent said first bearing section.

8. A rack and pinion steering gear assembly comprising a housing, a pinion gear rotatably mounted in said housing, a rack at least partially disposed in said housing in meshing engagement with said pinion gear, said rack having a longitudinally extending array of teeth and a longitudinally extending main body portion having a cross section which is at least partially defined by a circle, and bushing means for urging the teeth on said rack into meshing engagement with said pinion gear, said bushing means including a central bearing surface means extending therethrough for engaging said rack, said bearing surface means being at least partially defined by a plurality of arcuate bearing sections disposed in an annular array circumscribing said rack, each of said sections having a radius of curvature which is larger than the radius of curvature of said main body portion of said rack, and each of said sections having a different center of curvature displaced from the center of said main body portion of said rack.

9. An assembly as set forth in claim 8 further including means releasably holding said bushing means in said housing for enabling said bushing means to be selectively moved relative to said housing from a first position in which said main body portion of said rack engages a first portion of said bearing surface means to a second position in which said main body portion of said rack engages a second portion of said bearing surface means to thereby compensate for wear of said first position of said bearing surface means.

10. An assembly as set forth in claim 8 wherein said central bearing surface means further includes a plurality of surface means defining grooves from receiving lubricant, each of said grooves being disposed between two of said bearing sections.

11. An assembly as set forth in claim 8 wherein said central bearing surface means of said bushing means is defined by four arcuate bearing surfaces and surface means defining four grooves for receiving lubricant, said grooves and said bearing surfaces being disposed in alternating relationship about the periphery of said central bearing surface means.

12. A rack and pinion steering gear assembly including a housing, a pinion gear rotatably mounted in said housing, a rack extending axially through said housing and having a plurality of teeth disposed in meshing engagement with said pinion gear, said resilient bushing means disposed in said housing for urging said teeth on said rack into meshing engagement with said pinion gear, said bushing means having a axially extending bearing surface means defining an aperture therethrough, said aperture having a polygonal transverse cross section, said rack including an outside surface opposite said teeth, said aperture having a first axially extending portion disposed in sliding abutting engagement with said surface of said rack, said bushing means being rotatable with respect to said housing to place a second axially extending portion of said aperture in engagement with said surface of said rack to thereby compensate for wear of said first portion of said bushing means.

13. An assembly as set forth in claim 12 wherein said arcuate surface of said rack is disposed in sliding abutting engagement with two sides of said polygonal aperture through said bushing means.

14. An assembly as set forth in claim 12 further including means releasably holding said busing means in said housing for enabling said bushing means to be selectively moved relative to said housing between a first position in which said outside surface of said rack engages a first portion of said bearing surface means and a second position in which said outside surface of said rack engages a second portion of said bearing surface means to thereby compensate for wear of said first portion of said bearing surface means.

15. A rack and pinion steering gear assembly comprising a housing, a pinion gear rotatably mounted in said housing, a rack at least partially disposed in said housing in meshing engagement with said pinion gear, said rack having a longitudinally extending array of teeth and a longitudinally extending main body portion having a cross section which is at least partially defined by a circle, tubular bushing means for urging the teeth on said rack into meshing engagement with said pinion, said tubular bushing means including a circular array of arcuate bearing surfaces circumscribing said rack, said circular array of arcuate bearing surfaces having a diameter which is greater than the diameter of the circle which at least partially defines the cross section of the rack, and means for enabling said bushing means to be selectively rotated around said rack from a first position in which said main body portion of said rack engages a first pair of said bearing surfaces to a second position in which said main body portion of said rack engages a second pair of said bearing surface and is spaced from said first pair of bearing surfaces to thereby compensate for wear of said first pair of bearing surfaces.

16. An assembly as set forth in claim 15 wherein each of said arcuate bearing surfaces has the same radius of curvature and a different center of curvature.

17. An assembly as set forth in claim 16 wherein the radius of curvature of each of said arcuate bearing surfaces is larger than the radius of curvature of said main body portion of said rack.

18. An assembly as set forth in claim 15 wherein said bushing means further includes surface means defining a plurality of grooves for receiving lubricant, each of said grooves being disposed between two of said arcuate bearing surfaces.

19. An assembly as set forth in claim 15 wherein each of said arcuate bearing surfaces has the same radius of curvature and the same center of curvature, said radius of curvature being larger than the radius of curvature of said main body portion of said rack, said center of curvature being coincident with the center of the circular array of bearing surfaces.

* * * * *

UNITED STATES PATENT AND TRADEMARK OFFICE
CERTIFICATE OF CORRECTION

PATENT NO. : 4,218,933
DATED : August 26, 1980
INVENTOR(S) : David H. Allen, et al.

It is certified that error appears in the above-identified patent and that said Letters Patent are hereby corrected as shown below:

Column 10, line 6, change "busing" to --bushing--

Signed and Sealed this

Sixth Day of January 1981

[SEAL]

Attest:

SIDNEY A. DIAMOND

*Attesting Officer*     *Commissioner of Patents and Trademarks*